United States Patent [19]
Drews

[11] Patent Number: 5,841,447
[45] Date of Patent: Nov. 24, 1998

[54] SYSTEM AND METHOD FOR IMPROVING PIXEL UPDATE PERFORMANCE

[75] Inventor: Michael D. Drews, Sandy, Utah

[73] Assignee: Evans & Sutherland Computer Corporation, Salt Lake City, Utah

[21] Appl. No.: 510,508

[22] Filed: Aug. 2, 1995

[51] Int. Cl.⁶ .................................................. G06F 13/00
[52] U.S. Cl. ............................................ 345/523; 345/525
[58] Field of Search .................................. 395/507, 508, 395/509, 523; 345/113, 115, 119, 525, 501, 507, 508, 509, 523, 116, 118

[56] References Cited

U.S. PATENT DOCUMENTS

| | | | |
|---|---|---|---|
| 4,954,819 | 9/1990 | Watkins | 345/119 |
| 5,061,919 | 10/1991 | Watkins | 345/119 |
| 5,123,085 | 6/1992 | Wells et al. | 395/121 |
| 5,488,687 | 1/1996 | Rich | 395/508 |
| 5,590,254 | 12/1996 | Lippincott et al. | 345/115 |

OTHER PUBLICATIONS

Akeley, Kurt, "RealityEngine Graphics", Computer Graphics Proceedings, Annual Conference Series, 1993 ACM–0–89791–601–8/93/008/0109.

Primary Examiner—Raymond J. Bayerl
Assistant Examiner—Cao H. Nguyen
Attorney, Agent, or Firm—Thorpe, North & Western, LLP

[57] ABSTRACT

A system and method improves pixel update performance in computer graphics systems. Pixel sample coverage masks and data record memory locations are assigned to each pixel. The data record memory locations store pixel sample data for one or more pixel samples. A coverage mask is associated with each data record and contains mask bits which identify the pixel samples that are assigned the data contained in the data record memory location. In another embodiment, the pixels are also assigned versions which are compared with a current version. In response to the version comparison, predefined alternate pixel data or pixel data stored in a frame buffer is blended with new pixel data. The blended pixel data is written to the frame buffer from which it is retrieved and displayed by a display device. In another embodiment, pixel data memory is dynamically allocated to reduce the dedicated memory requirements while still providing high quality images.

24 Claims, 8 Drawing Sheets

SYSTEM AND METHOD FOR IMPROVING PIXEL UPDATE PERFORMANCE

FIELD OF THE INVENTION

The present invention relates to computer graphics systems and more specifically to pixel data flow enhancement using coverage masks, pixel data versions and dynamic memory allocation.

BACKGROUND OF THE INVENTION

Conventional computer graphics systems display images on a display screen having an array of picture elements (pixels). The displayed image typically represents a collection of graphic objects or a predefined visual scene. The displayed image is created by subdividing the graphic objects or visual scene into smaller elements such as points, lines or polygons that can be numerically represented in terms of size, color, location and other characteristics. Using the polygon elements as an example, when a given visual scene or collection of graphic objects is to be displayed, the polygon representations corresponding to that scene or collection of objects are processed to generate data that defines the visual characteristics for the pixels in the display screen. This data is used to generate electrical signals that sequentially illuminate the pixels on the display screen.

The polygon processing referred to above is commonly referred to in the field of computer graphics as polygon rendering. Polygon rendering involves processing each polygon to determine the influence each polygon has on the pixels in the display. This involves determining which pixels are influenced by a given polygon and determining the effect of the polygon in terms of characteristics such as color and transparency on those pixels. During conventional polygon rendering, a polygon is effectively sampled at intervals across the face of the polygon with each sample location corresponding to one of the pixels on the display screen. This "sample" consists of data, called pixel data, that represents the characteristics of the polygon at that location. The details of the polygon rendering process are well known in the art of computer graphics systems. For example, detailed operations and structures of polygon manipulation and display may be found in the book *Principles of Interactive Computer Graphics,* 2nd Edition, Newman and Sproull, McGraw-Hill Book Company, 1979.

The pixel data generated by the polygon rendering process is stored in a memory called a frame buffer. The frame buffer memory is organized so that each pixel in the display screen is assigned a specific memory location in the frame buffer. Thus, the pixel data for a given pixel is always written to the same location in the frame buffer. When the pixel associated with the pixel data in the frame buffer is to be displayed, the pixel data is read out of the frame buffer and sent to a display device that displays the converted pixel data on a display screen. The use of frame buffers to drive displays is also well known in the art. Various formats for organizing and scanning frame buffers to drive displays pixel-by-pixel are discussed in the textbook *Computer Graphics: Principles and Practice,* 2nd Edition, Foley, van Dam, Feiner & Hughes, (Reprinted in 1991) (1990), by Addison-Wesley Publishing Company, at chapters 4 and 18.

As the visual scene or the collection of graphic objects being displayed changes, new polygons are processed by the polygon rendering process. As a result, new pixel data is continually being generated which needs to be stored in the frame buffer. However, in many situations, the new pixel data is not simply written to the frame buffer. Instead, before the new pixel data is written to the frame buffer, the new pixel data is blended with pixel data that represents the image currently being displayed.

The pixel data would be blended, for example, when the new pixel data is generated from a semi-transparent polygon or from a polygon that contributes to only part of the pixel. In either case, if the pixel is currently displaying part of a scene background or part of another polygon, the new pixel data should be blended with the current pixel data to effectively represent the effects of all the contributions to the pixel.

In conventional computer graphics systems, the pixel data stored in the frame buffer memory represents the pixels that are currently being displayed on the display screen. Consequently, conventional pixel blending processes blend the newly generated pixel data with pixel data read from the frame buffer. This blended pixel data is then written back to the frame buffer. As the above description illustrates, a typical pixel data update process involves both reading pixel data from and writing pixel data to the frame buffer.

The images displayed by the computer graphics systems discussed above are subject to a display problem known as aliasing. Aliasing occurs, in part, because the displayed images are represented by a finite number of pixels of a fixed size. This display problem typically occurs when displaying polygons that have details that are physically smaller than the distance between the sample locations on the polygons. The effect of this aliasing problem typically is evidenced by undesirable visual effects such as the appearance of jagged lines in the displayed image.

In the computer graphics system art, methods used to reduce aliasing are commonly referred to as anti-aliasing. One conventional anti-aliasing technique involves taking multiple samples from a polygon for each pixel. By using more than one sample per pixel, the characteristics of the polygon represented by the smaller details will be retrieved from the polygon by the additional samples. These samples are then blended together to form a single sample value for the pixel. Since the blended pixel data is influenced by the smaller details, the aliasing effects will tend to be smoothed out in the displayed image.

Although the multi-sample method reduces aliasing in the displayed image and thereby yields a higher quality image, more operations must be performed to generate the pixel data for each pixel. For example, when the multi-sampling method involves simply reading every sample and blending the samples together, the number of operations increases linearly with the number of samples. In other words, as discussed above, a read of and a write to the frame buffer will be performed for every sample. In addition, the sample data storage requirements also increase linearly with the number of samples used. This is because the frame buffer typically contains all the sample values for every pixel in addition to the single composite pixel value.

The number of operations required to update the pixel data directly affects the speed with which the computer graphics system can display images. Thus, when rapidly changing scenes are being displayed, the processing speed of the computer graphics system must be proportionally increased to avoid undesirable slow screen updates. However, the use of faster processing components typically increases the cost of the computer graphics system. In addition, any additional memory requirements will increase the cost of the system. Consequently, a need exists for a computer graphics system that does not use excessive memory and that generates pixel data more efficiently, particularly when the system uses the multi-sampling technique.

SUMMARY OF THE INVENTION

The present invention reduces the processing required to update pixel data by reducing the amount of data that needs to be transferred when pixel data memory is updated. This is accomplished using pixel sample coverage masks to reduce the amount of data that is transferred when pixel sample data is written to and read from memory. Additional improvements in system performance are obtained with the use of pixel data versions and alternate pixel data during the pixel data update process. In addition, dynamic allocation of additional storage to certain pixels allows for greater picture quality without requiring large amounts of additional pixel memory.

The coverage masks of the present invention are used in computer graphics systems that use the multi-sampling technique. As discussed above, some computer graphics systems assign a storage location to each pixel sample. Thus, each location holds the data for one pixel sample. In contrast, the present invention defines data record memory locations and coverage masks for each pixel. Each data record memory location can hold the data that corresponds to one or more of the pixel samples. Each coverage mask, in turn, is associated with one of the data records. These coverage masks contain a number of mask bits each of which corresponds to one of the samples for the pixel.

Sample data, such as color and depth information, is assigned to one of the pixel's samples by writing the color and depth data to one of the pixel's data record memory locations and setting the mask bit that corresponds to that sample. Using the coverage mask, a given color value can be assigned to more than one sample in a pixel by simply setting the appropriate mask bits for those samples. Consequently, the color value does not have to be written for each of the samples that are assigned that color.

The use of coverage masks also improves the efficiency of the system when sample data is read from the frame buffer. When the sample data is read from the frame buffer to be blended with newly generated sample data, a given color only has to be read once for each pixel. The process simply uses the mask bits to determine which samples in the pixel are assigned that color. In a given computer graphics scene, the same color is often assigned to a large number of pixels. Consequently, several samples in a given pixel will often be assigned the same color value. Thus, the use of coverage masks can significantly reduce the amount of data that must be transferred to and from the pixel data memory during the sample update process.

In another embodiment, the efficiency of the pixel update process is increased further through the use of pixel data versions and alternate pixel data. In this embodiment, a numbered version is defined for the pixel data associated with a given pixel in the display and a numbered current version is defined for one or more sets of pixels. The current version and each pixel version can be set to any one of a predefined range of version numbers. Moreover, the current version and each pixel version can be set independently of each other.

The alternate pixel data consists of a single set of pixel data. In other words, the alternate pixel data typically would contain a predefined color value and a predefined depth value. In one embodiment, the alternate pixel data is set to represent the background in the displayed image. This embodiment is particularly advantageous when used with computer graphics drawing processes that always clear an area to a background color before adding new objects to the displayed image. In this case, fewer operations will need to be performed when adding the new objects.

The version numbers and alternate pixel data are used when the pixel data is being updated. As discussed above, updated pixel data is typically generated by blending newly generated pixel data with current pixel data that corresponds to the image that is currently being displayed. In the present invention, before the pixel data is updated, the version number associated with the current pixel data is compared to the current version number. If the version numbers do not match, the current pixel data is not read. Instead, the alternate pixel data is blended with the newly generated pixel data.

The above procedure provides more efficient processing in a number of ways. For example, multiple pixels can be changed to a different color in a single operation by merely changing the current version number. In addition, individual samples will not be read from the pixel data memory when the version numbers do not match. Consequently, fewer data transfers from the pixel data memory will be performed. Furthermore, if the alternate pixel data is stored in a processor register, the data can be accessed more efficiently than when the data is stored in an external memory such as a frame buffer.

The depth information referred to above is typically stored in one of two ways. In one embodiment, the actual depth value of each sample is stored for each sample. In the other embodiment, a reference value and associated geometric information is stored for each pixel and this data is used to calculate the actual depth value for each sample. Moreover, since color data and depth data are associated with each polygon, the same coverage mask that is used for the color data can be used for the depth data.

In another embodiment, some of the pixel data is stored in a dynamically allocated memory. In this embodiment, memory is allocated to a given pixel depending on the storage needed for that pixel. For example, a pixel that has a large number different sample values would be allocated more memory than a pixel in which every sample has the same value. Consequently, high quality images can be generated without dedicating excessive memory where it is not needed.

As the above discussion illustrates, significant improvement in system performance can be achieved using a computer graphics system constructed according to the present invention. For example, the drawing operation can skip reading the samples when the version numbers do not match. If, however, the versions do match, since each individual color and depth record only needs to be read once, a value might not have to be read for every pixel sample location. Furthermore, after the samples are blended, since a given color and depth record is only written once to each pixel, a value might not have to be written at every pixel sample location. In sum, a computer graphics system constructed in accordance with the present invention can provide improved pixel update performance while efficiently using pixel data memory.

BRIEF DESCRIPTION OF THE DRAWINGS

In the drawings which constitute a part of this specification, an exemplary embodiment exhibiting various objectives and features hereof is set forth, specifically.

DESCRIPTION OF THE PREFERRED EMBODIMENT

As required, a detailed illustrative embodiment of the present invention is disclosed herein. However, computer graphics systems, component operating structures, polygon rendering techniques, pixel processing techniques, pixel data memories, sampling techniques and blending techniques as well as other elements utilized in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
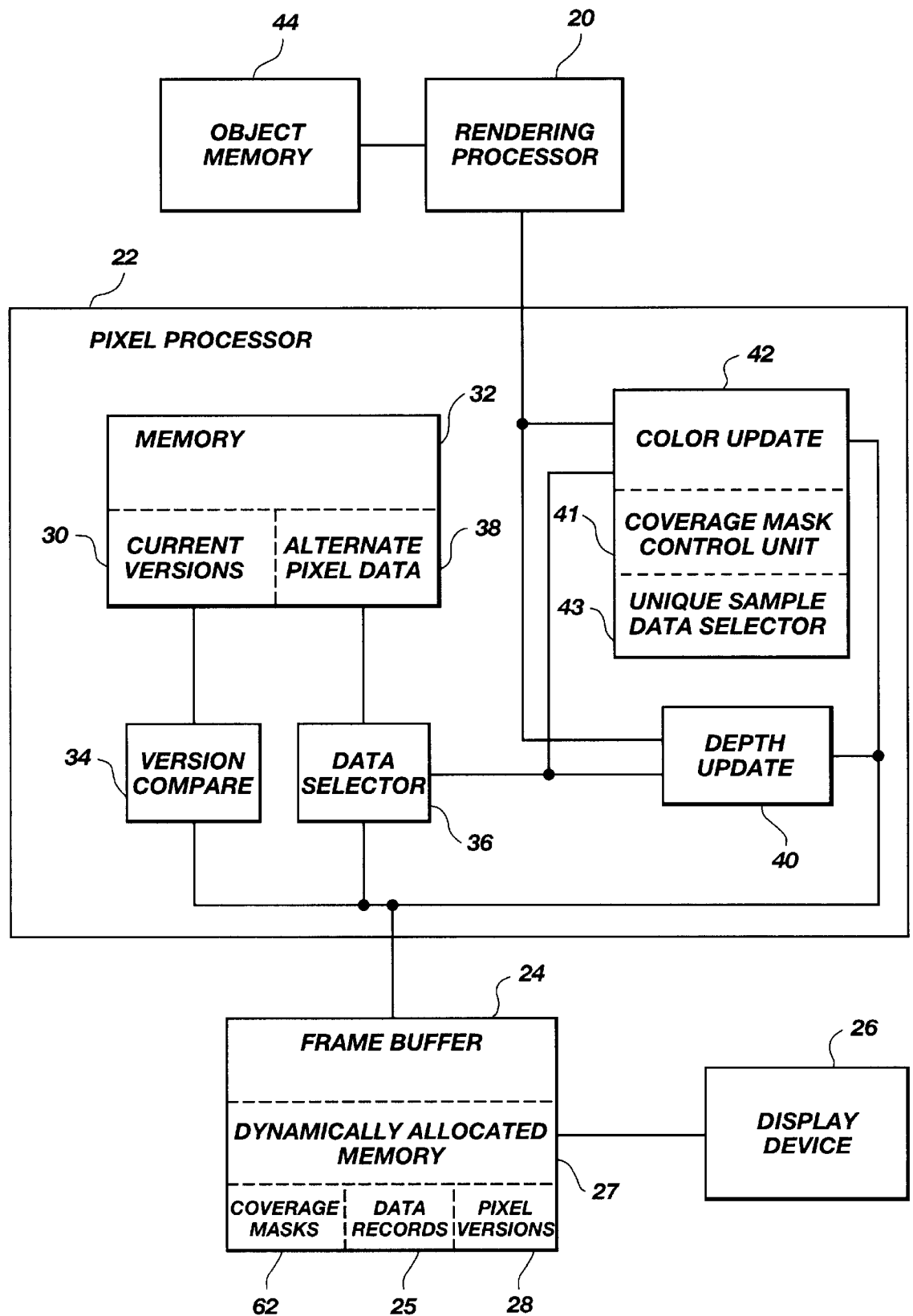
FIG. 1 is a block diagram illustrating one embodiment of a system constructed in accordance with the present invention.

Referring initially to FIG. 1, one embodiment of a computer graphics system constructed in accordance with the present invention is shown. As discussed in detail below, a rendering processor 20 (top center) generates pixel data and coverage masks that are blended with other pixel data by a pixel processor 22. The pixel processor 22 writes the blended data to a frame buffer 24 after which the updated pixel data is read out of the frame buffer 24 and sent to a display device 26.

According to the present invention, at least one data record and coverage mask is defined for each of the display device's pixels (not shown). As FIG. 1 shows, the data record memory locations 25 and coverage masks 62 are located in the frame buffer 24 in the disclosed embodiment. The data records 25 are used to store the pixel sample data for the associated pixel. Each of the data records, in turn, has an associated coverage mask 62. The coverage masks 62 contain a number of mask bits (not shown) each of which corresponds to one of the pixel's samples.

The pixel processor 22 updates the pixel data for a given pixel by writing the pixel sample data to the data records 25 and setting the appropriate coverage mask bits. In the embodiment of FIG. 1, a unique sample selector 43 selects unique sample data values from the pixel sample data so that only one data record 25 for a given pixel will contain each unique value. If the pixel sample data consists of more than one unique value, the pixel processor writes each unique value to a separate data record 25. For each data record, a coverage mask control unit 41 sets the mask bits in the corresponding coverage mask 62. Thus, if a given sample value corresponds to more than one pixel sample in a given pixel, all of the mask bits associated with those pixel samples are set in the corresponding coverage mask. Consequently, since a given pixel will often have several samples assigned the same value, fewer frame buffer write operations will be performed when updating the pixel data.

Figure 3:
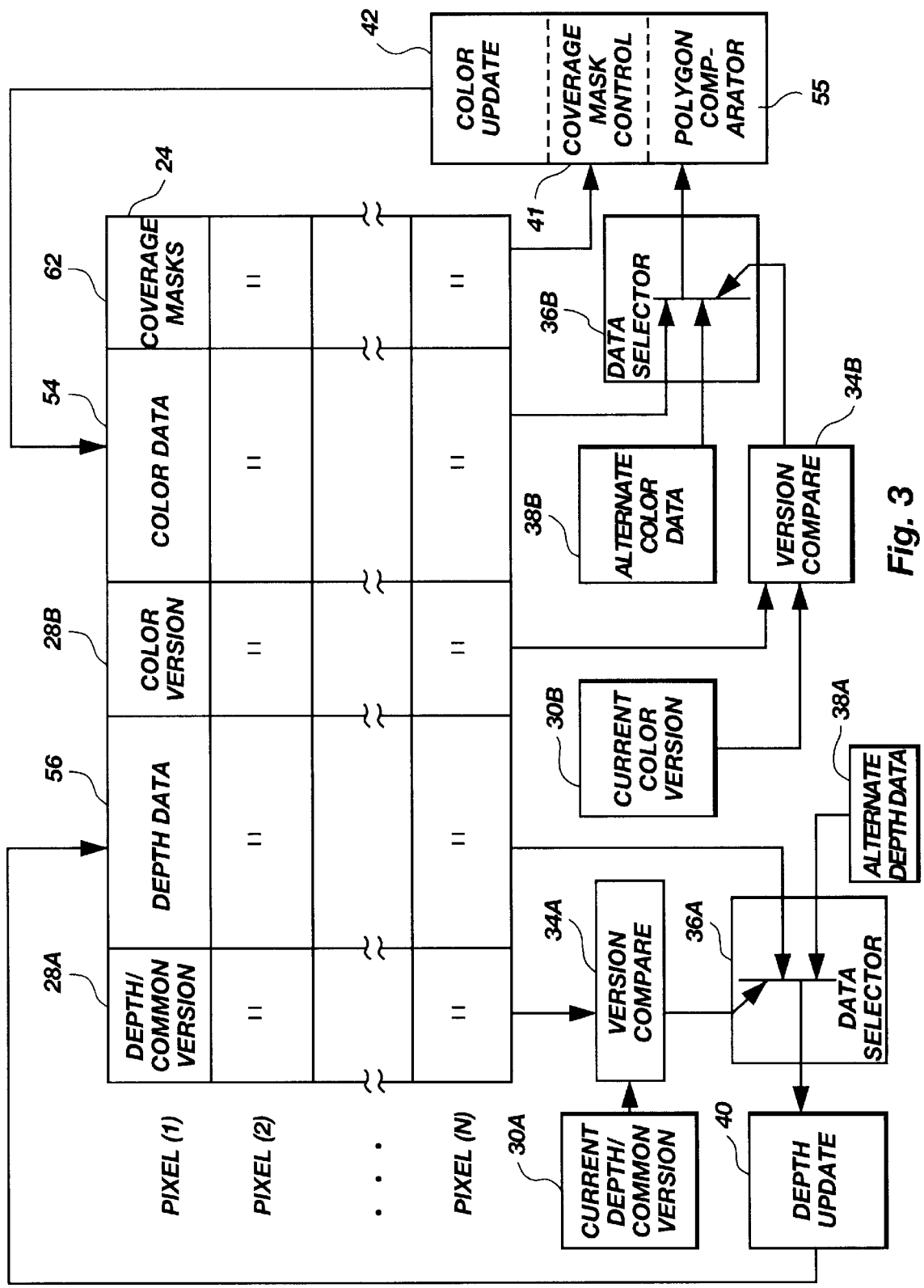
FIG. 3 is a block diagram showing selected components depicted in FIG. 1.

In alternative embodiment, the unique sample data selector 43 is replaced with a polygon comparator 55 (FIG. 3, bottom right). The polygon comparator 43 compares the polygons that are associated with the pixel data generated by the rendering processor 20. When the polygon comparator 55 receives pixel data that is associated with a different polygon than the previously received pixel data, the polygon comparator 55 assigns the newly generated pixel data to different data records 25 in the frame buffer. This operation improves the efficiency of the system since different polygons will typically define different colors in the displayed image. Consequently, the pixel data associated with those polygons will contain different color values. Thus, this embodiment provides an efficient method of assigning the pixel samples to the data records.

In either embodiment, when the pixel processor retrieves pixel data from the frame buffer 24, the pixel processor only reads a data record 25 if the coverage mask 62 associated with that data record has mask bits that are set. Thus, fewer frame buffer read operations will be performed when reading out the pixel data.

In addition, to further reduce the quantity of data that must be read from the frame buffer 24 when the pixel data is updated, a series of version numbers are used to select one of two sources of pixel data that will be blended with the pixel data generated by the rendering processor 20. The pixel processor 22 retrieves a pixel version 28 from the frame buffer 24 and a current version 30 stored in a memory 32. A version compare component 34 then compares the two version numbers and sends the results to a data selector component 36. If the version numbers do not match, the data selector 36 selects alternate pixel data 38 which is read from the memory 32. If the version numbers match, the data selector 36 selects current pixel data that is stored in the frame buffer 24.

After the selected data is read, it is blended with the newly generated pixel data and written to the frame buffer 24. In the disclosed embodiment, a depth update component 40 blends the depth data of the selected pixel data with the depth data of the pixel data generated by the rendering processor 20. Similarly, a color update component 42 blends the color data of the selected pixel data with the color data of the pixel data generated by the rendering processor 20. In addition, the coverage mask control unit 41 calculates updated coverage masks for the blended pixel data and writes the coverage masks to the frame buffer 24 along with the pixel data.

As FIG. 1 shows, in the disclosed embodiment the frame buffer contains dynamically allocated memory 27. This allows memory to be allocated to the frame buffer as needed which reduces the amount of statically allocated memory that must be dedicated to the frame buffer. In sum, the disclosed embodiment provides a more efficient computer graphics system because less data needs to be transferred between the pixel processor 22 and the frame buffer 24 and because less frame buffer storage is used.

In order to more fully appreciate the structure and operation of the present invention, the disclosed embodiment will be discussed in more detail. As shown in FIG. 1, the major components of the disclosed embodiment include an object memory 44, a polygon rendering processor 20, a pixel processor 22, a frame buffer 24 and a display device 26.

The object memory 44 stores geometric polygon definitions (in this case polygons) representative of an image that will be displayed. As in conventional computer graphics systems, an image to be displayed on a screen S (FIG. 2) is initially defined by a series of polygons 46 in a model space (not shown). These polygons are, in turn, represented by a number of polygon definitions that are stored in the object memory 44 (FIG. 1) where they can be accessed by the rendering processor 20.

The polygon rendering processor 20 processes the polygon definitions stored in object memory 44 and generates pixel data that is sent to the pixel processor 22 for further processing. In the disclosed embodiment, the pixel data is generated using standard scan conversion techniques. Accordingly, each polygon definition is processed to determine which pixels 48 (FIG. 2) in the screen S are influenced by the polygon 46 and to determine the effect of the polygon 46 on those pixels 48.

Figure 2:
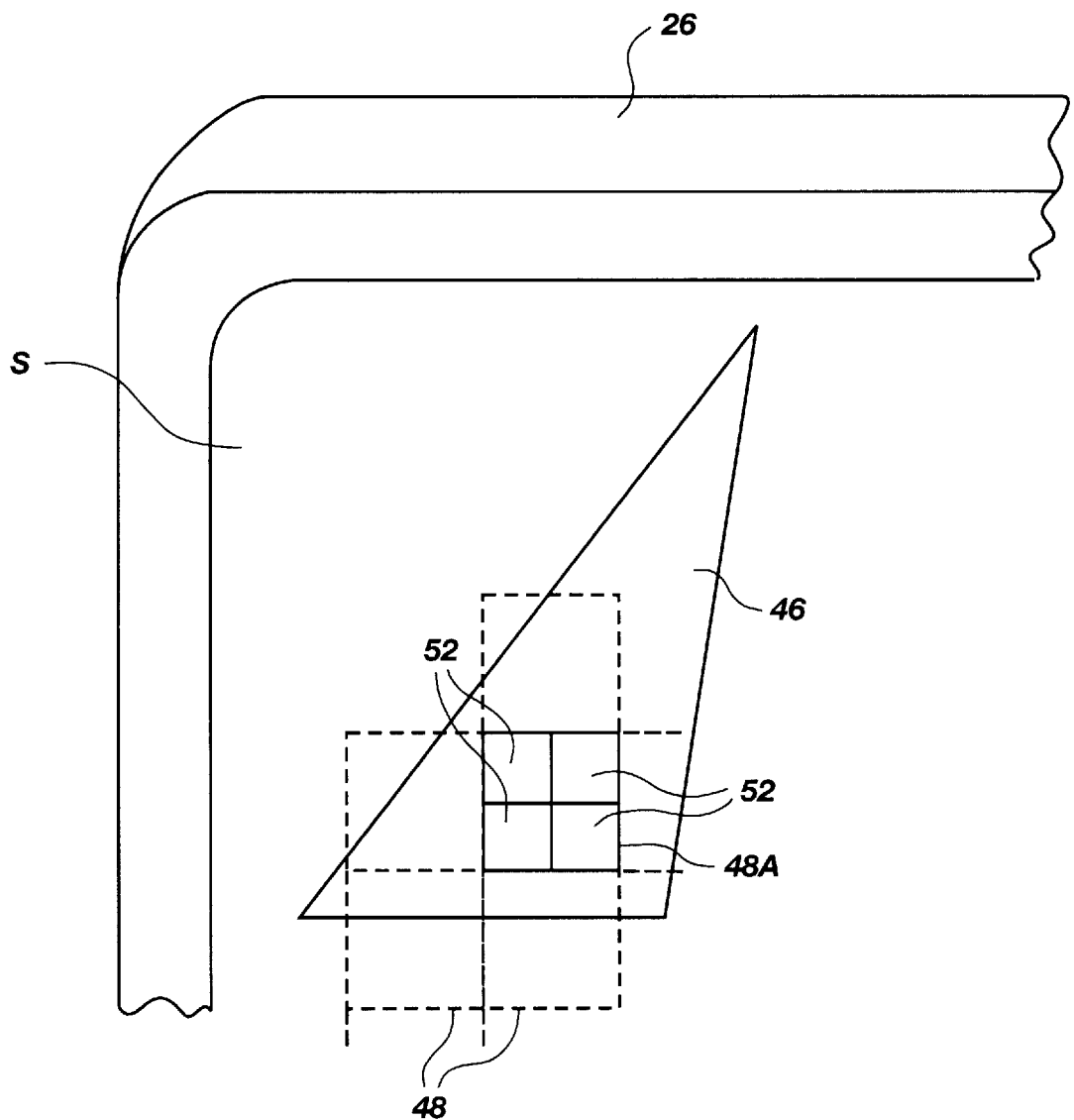
FIG. 2 is an magnified view of a computer screen showing a displayed polygon and pixel samples.

By way of explanation, FIG. 2 shows a polygon 46 (a triangle) defined in a three dimensional model space (not shown) behind the screen S. The polygon 46 will be displayed on the display screen S by a portion of the pixels 48 (illustrated as squares) in the display screen S. Consequently, for each of the pixels 48 that will display part of the polygon 46, the scan conversion process generates pixel data that represents the color, opacity, coverage and depth of the section of the polygon 46 that corresponds to that particular pixel.

In the disclosed embodiment, because multi-sampling anti-aliasing is used, the scan conversion process will generate pixel data for each pixel sample. For example, as shown in FIG. 2, the pixel 48A is subdivided into four areas (illustrated as equal sized squares) called subpixels or samples 52. Thus, during the scan conversion process, four depth values and four color values will be generated for each pixel instead of the one depth value and one color value that would have been generated if multi-sample anti-aliasing were not used.

Referring now to FIG. 3, the frame buffer 24 of FIG. 1 will be considered in more detail. The frame buffer 24 has been expanded to show the basic data organization within the frame buffer 24. The frame buffer 24 in FIG. 3 is shown organized in rows and columns to illustrate the relationship between each pixel and its associated pixel data. In practice, however, this format does not necessarily represent the actual physical organization of data in frame buffer memory. The row associated with the "PIXEL (1)" designation (upper left) depicts the basic pixel data associated with a given pixel. This pixel data format applies to every pixel in the frame buffer 24 but has been omitted from the other pixel rows in FIG. 3 to simplify the figure. The number of pixel entries in the frame buffer 24 is determined by the number of pixels in the display screen. In the embodiment of FIG. 3, the last pixel entry is designated by the "PIXEL (N)" row where "N" represents the number of pixels in the display screen.

The pixel data shown in FIG. 3 includes color data 54 and depth data 56. The color and depth data blocks represent the pixel color and pixel depth information that was written to the frame buffer 24 by the pixel processor 22 during the last pixel update operation. As discussed above, the color and depth data represent the color and depth of the portion of the polygon 46 (FIG. 2) that corresponds to each pixel.

Figure 4:
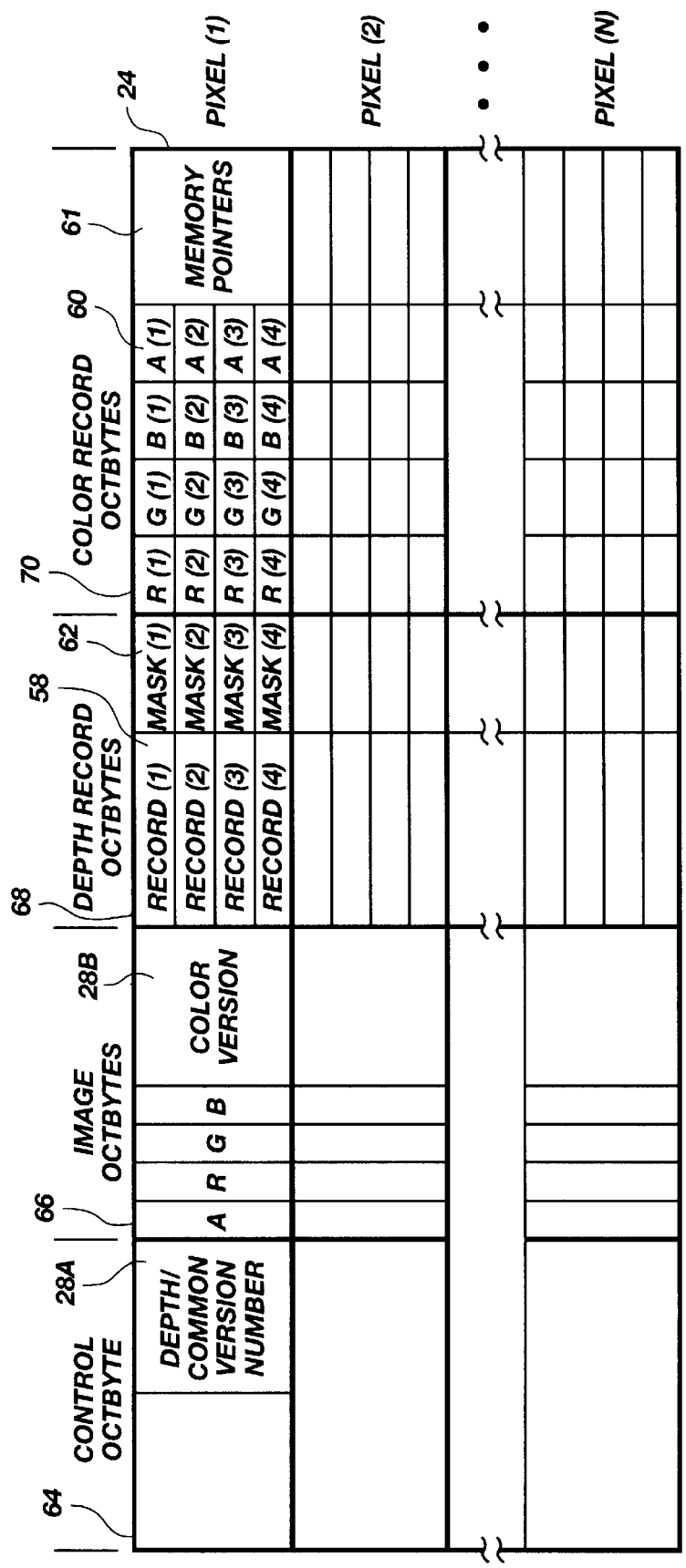
FIG. 4 is an exemplary embodiment of the frame buffer depicted in FIGS. 1 and 3.

In practice, the color and depth data shown in FIG. 3 contain several data record locations (not shown). This construction is more clearly depicted in FIG. 4 which illustrates a representative embodiment of a frame buffer 24 in a system that uses four data records for each pixel. As FIG. 4 shows, each set of pixel data can contain up to four depth records 58 and four color records 60.

In this embodiment, the memory for the data records would typically be both statically and dynamically allocated. For example, the data storage for the four records would typically be statically allocated. As storage for more records is needed, it can be allocated from a pool of shared memory. This allows for an arbitrary large number of data records to be stored for each pixel. The standard set of pixel data would also contain a memory pointer 61 to this additional storage.

Referring again to FIG. 3, the data for each pixel has a depth/common version 28A associated with its depth data 56 and a color version 28B associated with its color data 54. Version numbers are assigned by the pixel processor 22 (FIG. 1) to the depth and color versions when the pixel data is written to the frame buffer 24. The number of version numbers that can be assigned to a color or depth version is limited by the size of the memory location that is assigned to the color and depth versions.

The versions are used during the pixel processor's 22 blending operation to determine whether the color and depth data needs to be read from the frame buffer 24. In one embodiment of the present invention, one number is designated a "never valid" version number. When a depth/common version 28A or a color version 28B is assigned a "never valid" version number, the pixel processor 22 will not read the associated data from the frame buffer 24.

In another embodiment, only one version is used for a given pixel. In this embodiment, only one version—typically the depth/common version 28A—is stored with the pixel data and this version number is used for both the depth data and the color data. Thus, the pixel processor 22 uses the same version to determine whether the depth or color data needs to be read from the frame buffer 24.

The pixel data in the frame buffer 24 in FIG. 3 includes coverage masks 62 that are associated with the pixel's data records. As shown in FIG. 4, an embodiment that uses four data records per pixel will have four coverage masks 62. The coverage masks 62 contain a number of mask bits each of which corresponds to one of the samples for the pixel. Thus, each mask will contain four mask bits—one for each of the samples defined for the pixel (FIG. 2).

In one embodiment, separate coverage masks are associated 25 with the depth records 58. Each depth record has an associated coverage mask and each coverage mask has a number of mask bits each of which corresponds to one of the depth samples. In practice, it may be preferred to store the actual depth value at each sample rather than storing one depth value, the depth value geometry and a coverage mask and recalculating the depth value at each sample whenever it is needed.

For the purposes of illustration, FIG. 4 shows one embodiment that can be used to implement a frame buffer 24 in a four sample per pixel multi-sampling architecture. In the embodiment of FIG. 4, the frame buffer 24 is implemented using a dynamic RAM that is optimized to read and write bursts of eight 9-bits "chunks" of data located in sequential locations in memory. These groups of eight sequential memory locations are called "octbytes." Thus, the data in the frame buffer 24 is organized along "octbyte" boundaries.

The first of these octbytes—the control octbyte 64—typically contains the depth/common version 28A discussed above along with a pixel attribute index, clip planes and other pixel data (not shown). As discussed above, one depth/common version 28A is associated with each pixel.

The image octbytes 66, contain the color version 28B discussed above and resolved pixel data. Again, one color version 28B is associated with each pixel. The resolved pixel data is designated "A," "R," "G," and "B" which represents the alpha (opacity), red, green and blue color components of the pixel, respectively. The resolved pixel data is formed by blending each of the respective color components of the pixel's color samples to form one value for each color component. These blended color values are stored here before they are sent to the display device 26.

The depth record octbytes 68 contain the depth record data locations 58 and the coverage masks 62. As discussed above, up to four depth records 58 and four coverage masks 62 can be written for each pixel.

The color record octbytes 70 contain the color record data locations 60 and memory pointers 61 to additional storage. Up to four color records can be written for each pixel and, as discussed above, each color record contains a red, green, blue and alpha color component. Additional storage (not shown) could be allocated in each pixel location of frame buffer memory, or additional storage could be allocated for those pixels that needed it from a pool of shared memory (not shown).

The actual organization and physical implementation of a frame buffer 24 constructed in accordance with the present invention will depend on the a variety of factors. For example, depending on the selected architecture, different components of the pixel data discussed above might be stored in the frame buffer 24 or the pixel data may be stored in a different order from one implementation to another.

Referring again to FIG. 3, the pixel processor 22 of FIG. 1 will be considered in more detail. Specifically, several of the pixel data blending components of the pixel processor 22 have been isolated to more effectively illustrate their interaction with each other.

The current versions 30 that are depicted in the memory 32 of FIG. 1 are shown separated into their respective color and depth components in FIG. 3. The current color version 30B and current depth/common version 30A contain the predefined current version for the color and depth components of the pixel data, respectively. The version is selected based on the current operation being performed by the pixel processor 22 and can be changed at any time during the operation of the system. However, the number of version numbers that may be defined in a given system is limited by size of the memory location designated to hold the numbers. Several different current version numbers could be used for different areas of the screen. The correct current version number for the area of the screen being updated would need to be stored in the current version memory 30.

The alternate pixel data 38 that is depicted in the memory 32 of FIG. 1 is shown separated into its respective color and depth components in FIG. 3. The alternate color data 38B and the alternate depth data 38A contain the predefined alternate data for the color and depth components of the pixel data, respectively.

The format of the alternate data depends on the format of the pixel data that is generated by the rendering processor 20. For example, if the depth samples are 32 bits and the color samples are 16 bits for each color component, the alternate data would contain 32 bits of depth data 56 (FIG. 3) and 64 bits (16 bits each for Red, Green, Blue and Alpha) of color data 54.

The actual data that is written to the alternate data is selected according to the needs of the application and can be changed as needed. In a typical embodiment, the alternate data is written to a value that represents the color of the background in the displayed scene.

The versions and alternate data depicted in FIG. 3 are used during the pixel processor's pixel update operation. As new pixel data is generated for a given pixel by the rendering processor 20 (FIG. 1), the pixel processor 22 reads the depth/common version 28A that corresponds to that pixel from the frame buffer 24. As represented by a version compare component 34A, the depth/common version 28A is compared with the current depth/common version 30A. Then, the version compare component 34A sends a signal to a data selector 36A based on the results of the compare operation.

In response to the signal from the version compare component 34A, the data selector 36A selects either the alternate depth data 38A or the depth data 56 that corresponds to that pixel from the frame buffer 24. If the compared version numbers were equal, the depth data 56 from the frame buffer 24 is selected. Otherwise, the alternate depth data 38A is selected. In addition, if the depth/common version 28A is set to "never valid," the alternate depth data 38A would be selected. The pixel processor 22 then reads the selected data which is later blended with the pixel data generated by the rendering processor 20 (FIG. 1).

Similar version compare and data selector components and operations as discussed above are used with the color components in FIG. 3 as well. Thus, as represented by a version compare component 34B, the color version 28B is compared with the current color version 30B. The version compare component 34B then sends a signal to a data selector 36B that selects either the color data 54 from the frame buffer 24 or the alternate color data 38B.

Referring again to the depth data process, using known techniques, a depth update component 40 "blends" the depth data that was selected by the data selector 36A with the depth data from the newly generated pixel data (not shown). This involves calculating the new depth for each depth sample in the newly generated pixel data using base depth and depth geometric information. The new depth is then compared with the depth of the selected depth data and an updated depth value is calculated from the new and selected depth data. For example, if the selected data and the newly generated data represent interpenetrating polygons, the updated depth value may consist of depth values from both the selected and the newly generated data. As a result, only those depth samples from the newly generated data that will actually affect the pixel will be updated. In general, the depth blend consists of choosing either the data previously selected above or the newly generated depth data. These two blends are referred to as "Keep" and "Replace," respectively. This and other methods of blending depth values are well known in the art of computer graphics systems.

In a similar fashion, again using known techniques, a color update data component 42 "blends" the color samples of the selected pixel data with the color samples of the newly generated pixel data. Depending on the architecture of the computer graphics system being used and the particular pixel data involved in the blending operation, the blending operation may involve simply keeping some of the selected color samples or replacing some of the selected color samples with some of the newly generated color samples. Alternatively, the blending operation could involve blending the samples together to form a combined color value. In any event, the result is a single set of color sample values. Again, the blending of pixel data color samples is well known in the art of computer graphics systems.

Once the updated color samples have been generated, the coverage mask control unit 41 updates the coverage mask for each of the data records. This involves setting the bits in the coverage mask that correspond to the pixel samples 52 (FIG. 2) that contain this particular color and depth data. For example, referring to FIG. 2, if the same color and depth data is to be written to the top two samples 52 in the pixel, the two bits that correspond to those two samples in that data record's coverage mask would be set.

If a new color value is created by mixing two existing color values together at one or more samples, a new data record would be created for that color value, the mask bits in the new data record corresponding to the samples would be set, and those same bits would be cleared in the old color records that were mixed together.

Next, the color component values for the resolved pixel data are calculated. This involves blending the color components in the color samples. As an example, referring to FIG. 4, the red component for the resolved pixel could be calculated by blending the data designated "R(1)," "R(2)," "R(3)" and "R(4)." When each of the color components has been blended, the resolved pixel data contains a single value for each of its red, green, blue and alpha color components.

After the samples and resolved pixel data are calculated, the pixel processor 22 writes all the data to the frame buffer 24. Thus, using FIG. 4 as an example, the new color records are written to the color record octbytes 70, the new depth records are written to the depth record octbytes 68, the new coverage masks are written to the masks in the depth record octbytes 68 and the resolved pixel data is written to the image octbytes 66. In addition, if the pixel's version numbers need to be updated, this information would be written to the appropriate location in the frame buffer 24 as well.

The color samples are written to the frame buffer 24 by writing one instance of the color sample to one of the pixel's color data record locations 60 and by writing the coverage mask that corresponds to that color sample. Since each color is only written once for a given pixel, fewer write operations are required to update the pixel.

In addition, by clearing the mask bits of the color records that do not contribute to the pixel and by making these masks the last of the data record locations, the records can be read back in an efficient manner as well. In this case, the mask bits would be read before the color records were read and only those color records that have bits set in their masks would be read.

After the resolved pixel data has been written to the frame buffer 24, the pixel data is sent to a display device 26 (FIG. 1). The resolved pixel data is used to generate an image on a display screen using conventional computer graphics techniques. Accordingly, the resolved pixel data is read out of the frame buffer 24 and sent to the display device 26. The display device 26 then converts the pixel data into electrical signals that are used to illuminate the pixels on the display screen. The combined effect of the illuminated pixels then forms the desired image on the screen.

In view of the above description of the disclosed embodiment, it is apparent that a computer graphics system constructed according to the present invention will effectively provide improved pixel update performance. The use of coverage masks 62 reduces the amount of data that must be written to and read from the frame buffer 24. Consequently, fewer operations will need to be performed during the pixel update process which will improve the overall performance of the computer graphics system.

In addition, the use of pixel data versions provides an efficient way to change the pixel data for a given pixel. According to the present invention, the alternate pixel data 38 (FIG. 1) will be read instead of the current pixel data in the frame buffer 24 whenever the current version 30 and the pixel's depth or color version do not match or whenever the pixel's depth or color version is set to "never valid." Thus, the alternate data can be selected by changing the current version 30, by changing the pixel's depth or color version or by setting the pixel's depth or color version to "never valid."

In addition, by setting the alternate pixel data 38 to a value that represents the color of the background of the displayed image, improved performance can be achieved in computer graphics drawing operations. Most drawing operations clear an area to a background color before adding other objects to that area in the displayed image. However, if the pixel versions of the present invention are used, this process can be done more efficiently since the current pixel data can be effectively changed to a background color by appropriately setting the versions.

Moreover, the present invention can be used to cause multiple pixels to appear to contain a new value merely by changing the current version 30. This feature is particularly useful for clear operations where the pixels are to be set to the color of the background in the displayed scene. In this case, the alternate pixel data 38 is set to a number that represents the background color and the current version 30 is changed to a number that is different than the version of the pixels being cleared.

The disclosed embodiment would generally be implemented using standard computer graphics system components. Thus, the object memory 44 and the memory associated with the processors would be implemented using a conventional RAM data memory. However, these components may be implemented using any suitable data storage method.

The rendering and pixel processors would be implemented using one or more conventional graphics processors. The details of polygon rendering and pixel processing and the corresponding structures used to implement this processes are well known in the computer graphics art. Several of these techniques and structures are discussed at length in the above referenced books *Computer Graphics:Principles and Practice,* Foley, van Dam, Feiner & Hughes, and *Principles of Interactive Computer Graphics,* Newman and Sproull.

The version compare, data selector, coverage mask generator, unique sample data selector and polygon comparator operations described above typically would be implemented by the pixel processor 22. However, in some embodiments, these functions may be implemented using other functionally equivalent components including, but not limited to, discrete comparators, data selectors and logic devices.

As noted above, the memory 32 (FIG. 1) associated with the pixel processor 22 is implemented using RAM. Thus, the current versions 30 would be stored in RAM. In contrast, in the disclosed embodiment, the alternate pixel data 38 is stored in one or more of the pixel processor's internal registers. This implementation allows the background data to be retrieved quicker than when it its stored in an external memory. Nevertheless, the alternate pixel data 38 could be stored in an external RAM or any compatible form of data storage.

As discussed earlier, the frame buffer 24 can be implemented using octbyte RAMs. However, the frame buffer 24 may also be implemented using a wide variety of data storage devices including, but not limited to, conventional RAM devices. In either case, the memory is typically implemented using a some form of dynamic memory allocation. Various dynamic memory allocation techniques are also well known in the art.

Finally, the display device 26 can be implemented using any pixel-based display. As noted earlier, techniques for scanning frame buffers to drive displays pixel-by-pixel are well known in the art.

Figure 5A:
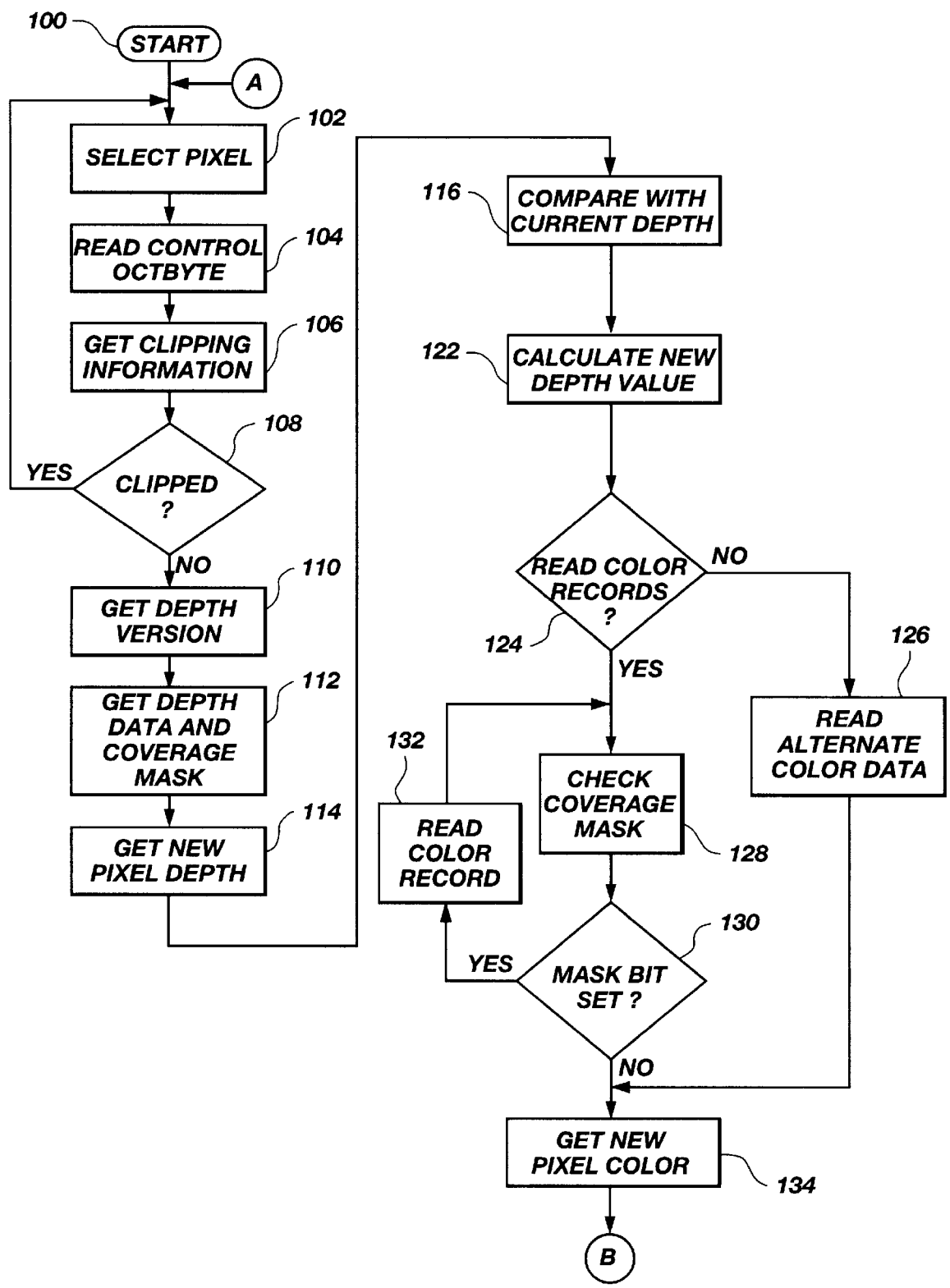
FIGS. 5A and 5B are a flow diagram illustrating an operating process for the system of FIG. 1.
Figure 5B:
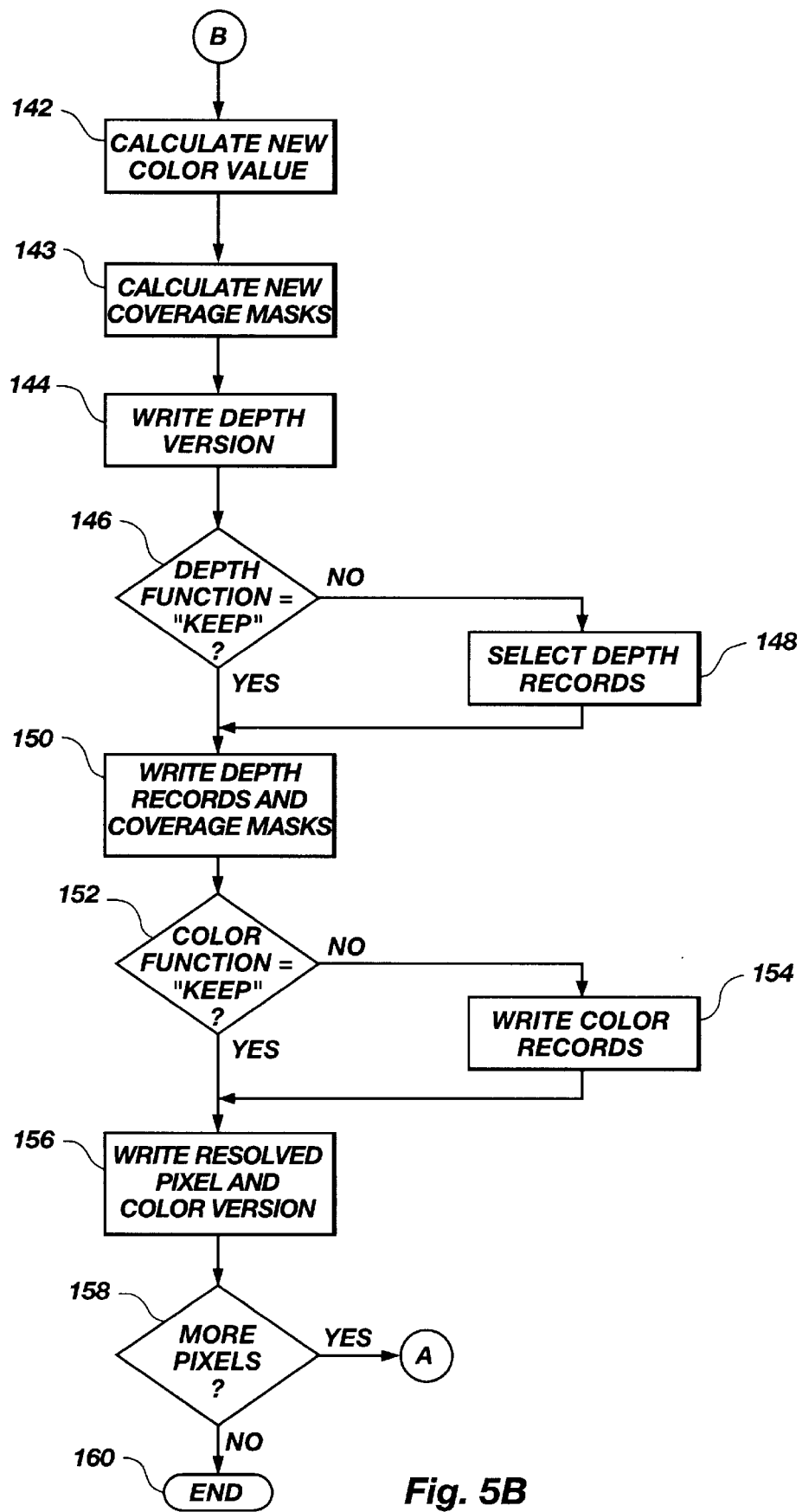

With the structure and function of the components of the present invention in mind, the basic operation of the pixel update process performed by the embodiment of FIG. 1 is treated in FIGS. 5A and 5B. The update process starts at a block 100 (upper left). At this point in the overall pixel generation and update process, the rendering processor 20 (FIG. 1) has already generated new pixel data, the current versions 30 and alternate pixel data 38 have been initialized and pixel data is in the frame buffer 24 (FIG. 4) from a prior update process.

As represented by a block 102, the pixel processor 22 (FIG. 1) selects which pixel is to be updated. The selected pixel will correspond to one set of pixel data that was generated by the rendering processor 20 and sent to the pixel processor 22.

At a block 104 the pixel processor 22 reads the control octbyte 64 (FIG. 4) in the frame buffer 24 that corresponds to the pixel being updated. As discussed earlier, the control octbyte 64 typically contains clipping information (not shown) and the pixel's depth/common version 28A.

At a block 106 the clipping information is retrieved from the control octbyte 64. This information is used to determine whether the pixel being processed should be written to the frame buffer 24.

If the pixel should not be written to the frame buffer 24, the process terminates at a block 108 and the update process starts over with a different pixel at the block 102. If the pixel should be written, the process proceeds to a block 110.

After the depth/common version 28A is retrieved from the control octbyte 64 at block 110, the pixel processor 22 uses the depth/common version 28A to determine whether the depth records 58 (FIG. 4) and color records 60 in the frame buffer 24 need to be read, as represented by a block 112. The steps involved in this procedure depend, in part, on whether the particular embodiment uses a separate depth version and color version for each pixel or whether it uses a depth/common version.

Figure 6:
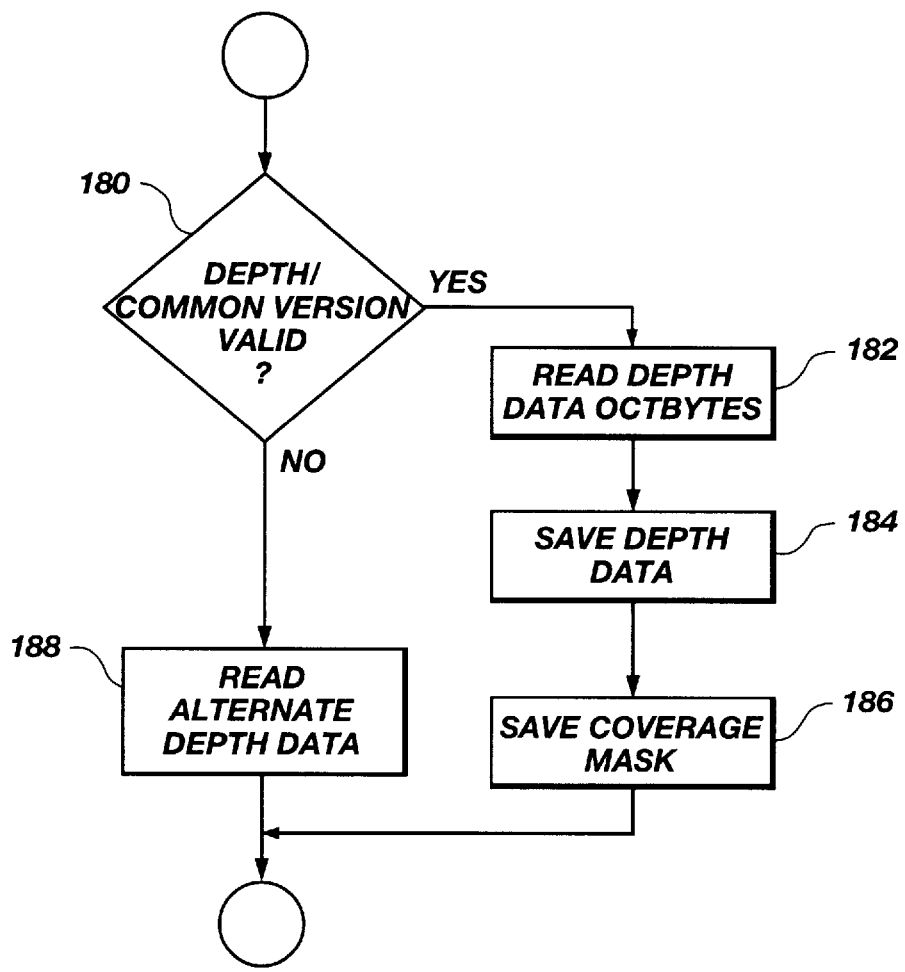
FIG. 6 is a flow diagram illustrating a portion of the operating process of FIGS. 5A and 5B.

If the embodiment only uses the depth/common version 28A, the process represented by block 112 is set forth in FIG. 6. Referring to FIG. 6, at a block 180 the pixel processor 22 (FIG. 1) determines whether the depth/common version 28A is valid. As discussed in conjunction with FIG. 3, this involves, first, determining whether the pixel's depth/common version 28A is set to "never valid" and, second, comparing the pixel's depth/common version 28A with the current depth/common version 30A. If the pixel's depth/common version 28A is not set to "never valid" and if the pixel's depth/common version 28A is equal to the current depth/common version 30A, the depth/common version 28A is valid. Otherwise the depth/common version 28A is not valid.

If the depth/common version 28A is valid, the version compare component 34A (FIG. 3) sends the appropriate signals to the data selectors 36 which, as represented by a block 182 (FIG. 6), select the depth record octbytes 68 and color record octbytes 70 (FIG. 4) in the frame buffer 24 that correspond to the pixel being updated. As represented by blocks 184 and 186, the pixel processor retrieves the depth records 58 (FIG. 4) and the coverage masks 62 from the depth sample octbytes 68 and stores them for later use.

If the depth/common version 28A was not valid at block 180, instead of proceeding to block 182, the process would proceed to a block 188. As represented by block 188, the data selectors 36 (FIG. 3) select the alternate depth data 38A whereupon the pixel processor retrieves the data and stores it for later use.

At this point in the process of the embodiment that uses the depth/common version 28A (FIG. 4), the depth data 56 that will be blended with the newly generated pixel data has been retrieved by the pixel processor 22. In addition, the coverage masks 62 for the data records have also been retrieved.

Figure 7:
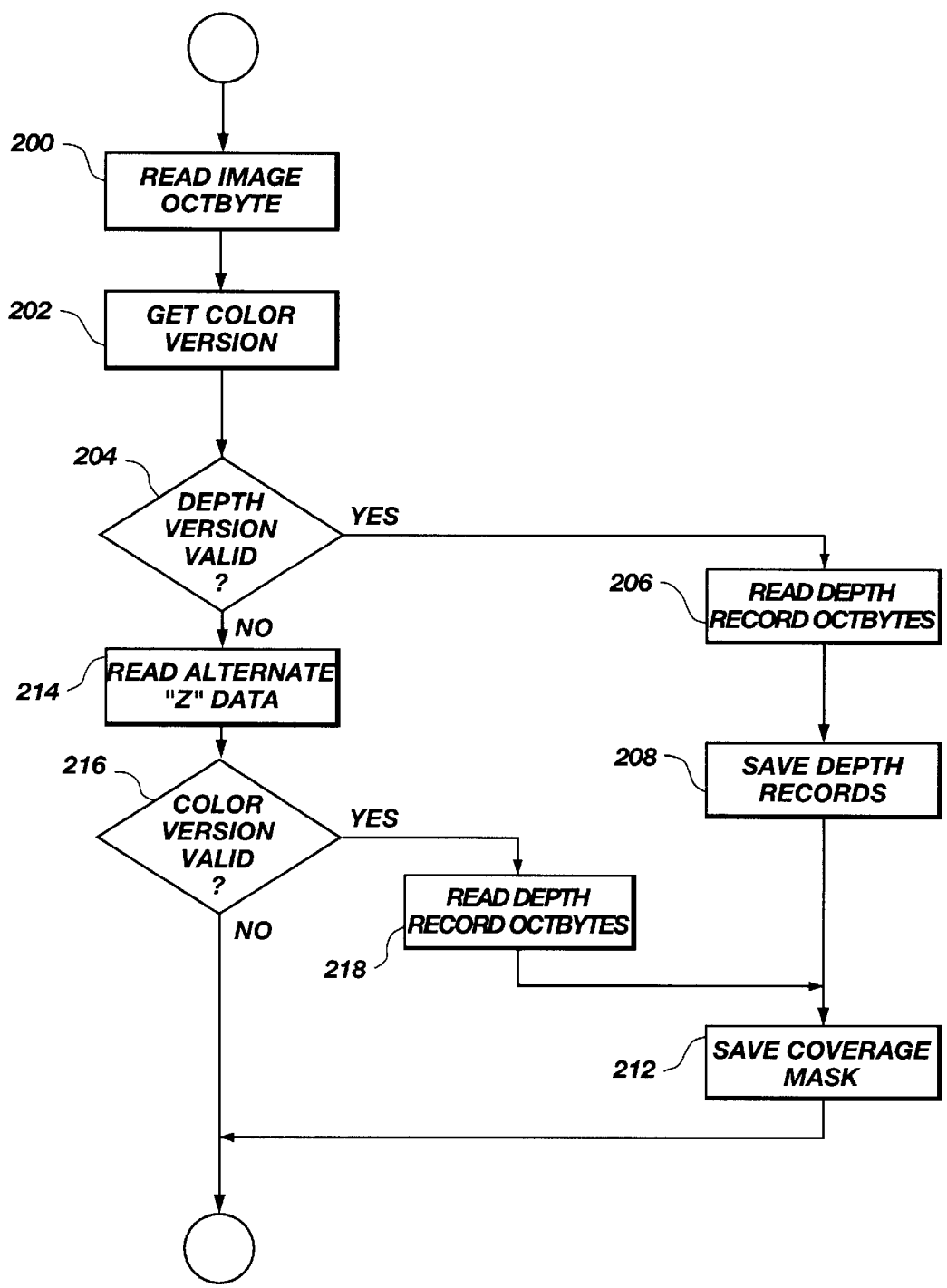
FIG. 7 is a flow diagram illustrating an alternative process for the process of FIG. 6.

If the embodiment pertaining to FIG. 6 is not used and, instead, the embodiment uses both depth versions and color versions, the process represented by block 112 (FIG. 5A) is set forth in FIG. 7. Referring to FIG. 7, as represented by a block 200, the pixel processor reads the image octbytes 66 (FIG. 4) in the frame buffer 24 that correspond to the pixel being updated. Then, as represented by a block 202, the color version 28B (FIG. 4) is retrieved from the image octbytes 66.

At a block 204 the pixel processor determines whether the depth version 28A is valid. This involves the same procedure performed in conjunction with FIG. 6, blocks 180, 182, 184 and 188. Thus, as represented by a block 206, if the depth version 28A is valid, the pixel processor reads the depth record octbytes 68 (FIG. 4) and, as represented by a block 208, the pixel processor 22 retrieves the depth records 58 from the depth record octbytes 68 and stores them for later use.

This part of the process then proceeds to a block 212 and the coverage masks 62 are retrieved from the depth record octbytes 68 read at block 206. This part of the process then terminates.

If the depth version 28A was not valid at block 204, the process would proceed to a block 214 and, as described in FIG. 6, block 188, the pixel processor 22 retrieves the alternate depth data 38A and stores it for later use.

Then, at a block 216 the pixel processor 22 determines whether the color version 28B is valid following the same procedure described for block 210. If the color version 28B is not valid, this part of the process terminates. If the color version 28B was valid at block 216, the pixel processor 22 reads the depth record octbytes 68 in the same manner as described in block 206 and the process proceeds to block 212 where the color mask is saved in a similar manner as discussed above. Thus, if either the depth version 28A or the color version 28B is valid, the coverage mask gets saved at block 212.

At this point in the process of the embodiment that uses the color version 28B (FIG. 4), the depth data 56 that will be blended with the newly generated pixel data and the associated coverage masks have has been retrieved by the pixel processor 22. In addition, if the color samples are valid, the coverage masks 62 for the data records have also been retrieved.

Referring again to FIGURE 5A, the process proceeds to a block 114 where the pixel processor 22 (FIG. 1) gets the depth samples from the newly generated pixel data. As represented by a block 116, these depth samples are compared with the depth samples that were retrieved by the process as described in conjunction with block 112.

Based on the results of the comparison, a new depth value is calculated for the samples at a block 122. The procedure for updating the depth value was discussed earlier in conjunction with the depth update component 40 in FIG. 3.

At block 124, the pixel processor 22 determines whether the color records 60 in the frame buffer 24 should be read. This determination is based, in part, on which embodiment was used at block 112. If the embodiment that uses the depth/common version 28A is used, the color records will only be read if the depth/common version 28A (FIG. 3) was not set to "never valid" and if the depth/common version 28A was equal to the current depth/common version 30A. This procedure is the same as described in conjunction with FIG. 6.

On the other hand, if the color version 28B is also used, the color records will only be read if the color version 28B (FIG. 3) was not set to "never valid" and if the color version 28B was equal to the current color version 30B. As discussed in conjunction with FIG. 3, the version compare component 34B sends the appropriate signal to the data selector 36B which then selects either the alternate color data 38B or the color records 60 in the frame buffer 24.

As represented by a block 126, if data selector 36B (FIG. 3) selects the alternate color data 38B, the pixel processor 22 reads the alternate color data 38B. The process then proceeds to a block 134.

On the other hand, if the data selector 36B selects the frame buffer data, the pixel processor 22 must read the pixel data from the frame buffer 24. In the disclosed embodiment, the coverage masks 62 retrieved at block 112 are sequentially checked to see whether any of their mask bits are set. By checking the mask bits first, the disclosed embodiment provides an efficient method of retrieving data from the frame buffer 24. For example, if no mask bits are set, the corresponding color record does not have to be read since it does not contribute to the displayed pixel. In addition, if the records that contribute to the displayed pixel are always placed in the top record locations (i.e., the record locations with the lowest numbers in FIG. 4), the pixel processor 22 can stop reading the records once a mask with no bits set is encountered.

Thus, at a block 128 the coverage masks 62 retrieved at block 112 are checked to see if any mask bits are set. At a block 130, if no mask bits are set, no more records contribute to the displayed pixel and, as a result, no more color records need to be read. Consequently, the process proceeds to block 134.

However, if any mask bits are set, the color records that correspond to the set mask bits in the coverage mask do contribute to the displayed pixel. Therefore, at a block 132, the color record octbytes 70 in the frame buffer 24 are read and the color records with mask bits that are set are retrieved.

The process then continues through the loop consisting of blocks 128, 130 and 132. The process continues checking for set mask bits and reading the corresponding color records until a mask without any bits set is found or until the all of the coverage masks 62 have been checked. After all the color records that are to be read have been read, the process proceeds to block 134.

At block 134, the pixel processor 22 (FIG. 1) gets the color samples from the newly generated pixel data. A new color value is calculated for the color samples and the sample components are blended to form the resolved pixel at a block 142. Then, at a block 143, the coverage masks 62 for each data record are calculated. The procedure for updating these color components was discussed earlier in conjunction with the color update component 42 in FIG. 3.

At this point in the pixel update process, the updated color records, the updated depth records, the coverage masks and the resolved pixel are ready to be written to the frame buffer. As represented by a block 144, if a new depth version is to be assigned to the pixel, the depth/common version 28A is written to the control octbyte 64 in the frame buffer 24 (FIG. 4).

As represented by blocks 146 and 148, the depth records that have changed (or been replaced) need to be written to the frame buffer 24. In contrast, the depth records that have not changed (or have been kept) do not need to be written to the frame buffer 24. Thus, as represented by a block 150, the depth records selected at block 148 and the coverage masks calculated at block 143 are written to the depth record octbytes 68 (FIG. 4).

As represented by blocks 152 and 154, the color records that have changed (or been replaced) are written to the color record octbytes 70 (FIG. 4). The color records that have not changed (or have been kept) do not need to be written to the frame buffer 24.

Next, the resolved pixel data generated at block 142 and the color version 28B—if the color version 28B is used and needs to be changed—are written to the image octbytes 66 (Block 156).

The pixel processor 22 then checks whether any more newly generated pixels need to be updated at a block 158. If more pixels are to be updated the process returns to block 102 where the above process is repeated for the next pixel. If no more pixels are to be updated, the process terminates at a block 160.

As the above process description illustrates, the pixel update process of the disclosed embodiment incorporates several shortcuts that reduce the amount of time needed to complete the update process. For example, if the clipping test fails, the process is terminated. In addition, if the depth records are not valid, the pixel processor 22 can skip ahead to reading the color records. Furthermore, if the color records are not valid, the pixel processor 22 can skip ahead to writing the new depth records. If, however, some of the color records are valid, if these color records apply to more than one pixel sample location and all of the different color records have been read, the pixel processor 22 can skip ahead to writing the depth records. When writing the depth records, if the depth records have not changed, the pixel processor 22 does not have to write the depth records and can skip ahead to writing the color records. If the color records have not changed, the pixel processor 22 does not have to write the color records and the update process terminates. If the color records have changed but some of the color records apply to more than one pixel sample 52 (FIG. 2), the pixel processor 22 does not have to write every pixel sample location. Instead, each distinct color sample value is written to one color record per pixel after which the pixel processor 22 can skip ahead to writing the resolved pixel to the image octbytes 66.

From the above, it is apparent that the system disclosed herein utilizing pixel versions, alternate pixel data and coverage masks offers an improved system for updating pixel data. Recognizing that the system can be implemented with standard graphics components, it should be noted that considerable variation may occur in the specific components and operating format. The scope of the present invention should be determined with a reference to the claims set forth below.

What is claimed is:

1. A computer graphics system for displaying dynamic images on a display device using multiple sample pixel data representative of said dynamic images, comprising:

a processor to generate multiple samples of data per pixel;

a coverage mask control unit to manage coverage masks associated with said multiple samples of data per pixel;

a data memory for storing said coverage masks and said multiple samples of data per pixel;

a display device for displaying dynamic images represented by said multiple samples of data per pixel stored in said memory.

2. A computer graphics system according to claim 1 wherein said coverage masks include a plurality of mask bits and each of said mask bits is associated with a pixel data sample.

3. A computer graphics system according to claim 1 wherein said data memory comprises a frame buffer.

4. A computer graphics system according to claim 3 wherein said frame buffer also contains dynamically allocated memory.

5. A computer graphics system according to claim 1 further comprising a unique sample data selector to select unique samples from said multiple sample pixel data.

6. A computer graphics system according to claim 5 wherein said unique samples are stored in distinct data record locations in said data memory.

7. A computer graphics system according to claim 1 further comprising a polygon comparator to compare polygons associated with said multiple sample pixel data to assign locations in said data memory to multiple sample pixel data.

8. A computer graphics system according to claim 5 wherein multiple sample pixel data associated with distinct polygons are assigned to distinct data record locations in said memory.

9. A computer graphics system according to claim 1 further comprising a data record reader to retrieve said multiple sample pixel data from said data memory, said data record reader including a coverage mask tester to test for at least one set mask bit.

10. A computer graphics system according to claim 1 wherein said coverage mask control unit further comprises a coverage mask writer to write said coverage masks to said data memory.

11. A computer graphics system according to claim 1 wherein said coverage mask control unit further comprises a coverage mask reader to retrieve said coverage masks from said data memory.

12. A computer graphics system according to claim 1 further comprising a sample data blender to blend multiple sample pixel data with multiple sample pixel data stored in said data memory, said sample data blender including a coverage mask tester to test for at least one set mask bit.

13. A computer graphics system according to claim 1 further comprising:

a data memory for storing alternate pixel data and at least one current version;

a comparator to compare at least one pixel version associated with said multiple sample pixel data with said at least one current version; and a data selector responsive to said comparator and connected to select said alternate pixel data or said multiple sample pixel data.

14. A computer graphics system for displaying dynamic images on a display device having an array of pixels, comprising:

a rendering processor to generate multiple samples of data per pixel representative of said dynamic images;

a pixel processor to process said multiple samples of data per pixel, said pixel processor including a coverage mask control unit to manage coverage masks associated with said multiple samples of data per pixel and a pixel data blender to blend said multiple samples of data per pixel to provide pixel data for display;

a frame buffer for storing said multiple samples of data per pixel, said coverage masks and said pixel data for display; and a display device for displaying said pixel data for display.

15. In a computer graphics system with a display device having an array of pixels, a process for displaying a dynamic image represented by multiple samples of data per pixel, comprising the steps of:

generating multiple samples of data per pixel;

generating at least one coverage mask for said multiple samples of data per pixel;

storing said multiple samples of data per pixel in a memory;

storing said at least one coverage mask in a memory;

generating pixel data for display using said multiple samples of data per pixel;

generating an electrical signal corresponding to said pixel data for display to actuate a pixel associated with said dynamic image; and displaying said dynamic image on said display device.

16. A process according to claim 15 wherein said storing said multiple sample pixel data further includes the step of allocating memory for said multiple sample pixel data.

17. A process according to claim 15 further including the step of selecting unique samples from said multiple sample pixel data.

18. A process according to claim 15 further including the step of assigning distinct memory locations to multiple sample pixel data associated with said distinct polygons.

19. A process according to claim 15 further including the step of retrieving said multiple sample pixel data from a memory.

20. A process according to claim 19 wherein said retrieving further includes the step of testing for at least one set mask bit in a coverage mask.

21. A process according to claim 15 further including the step of retrieving said at least one coverage mask from a memory.

22. A process according to claim 15 further including the step of blending multiple sample pixel data with multiple sample pixel data stored in a memory to generate updated pixel data.

23. A process according to claim 22 wherein said blending further includes the step of testing for at least one set mask bit in a coverage mask.

24. A process according to claim 15 further including the steps of:

defining a pixel version for said multiple sample pixel data;

defining alternate pixel data;

defining a current version;

comparing said pixel version with said current version; and selecting said multiple sample pixel data or said alternate pixel data in response to said comparing.

* * * * *